US007693601B2

(12) United States Patent
Graushar et al.

(10) Patent No.: US 7,693,601 B2
(45) **Date of Patent: *Apr. 6, 2010**

(54) COMBINED MAILING STREAMS

(75) Inventors: William T. Graushar, Elm Grove, WI (US); John C. Geres, West Allis, WI (US); Steven S. Jost, Pewaukee, WI (US)

(73) Assignee: Quad/Graphics, Inc., Sussex, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/040,399

(22) Filed: Feb. 29, 2008

(65) Prior Publication Data

US 2008/0147233 A1 Jun. 19, 2008

Related U.S. Application Data

(63) Continuation-in-part of application No. 11/959,683, filed on Dec. 19, 2007, now Pat. No. 7,477,964, which is a continuation of application No. 11/380,667, filed on Apr. 28, 2006, now Pat. No. 7,333,878, which is a continuation of application No. 10/262,116, filed on Oct. 1, 2002, now Pat. No. 7,096,088.

(60) Provisional application No. 60/326,324, filed on Oct. 1, 2001.

(51) Int. Cl.
*G06F 7/00* (2006.01)

(52) U.S. Cl. ...................... 700/223; 700/220; 270/1.02; 270/1.03; 270/52.02

(58) Field of Classification Search ................ 270/1.01, 270/1.02, 1.03, 52.02; 700/219, 220, 221, 700/223, 224, 226, 227, 213; 53/284.3
See application file for complete search history.

(56) References Cited

U.S. PATENT DOCUMENTS

| | | | | |
|---|---|---|---|---|
| 3,819,173 | A | 6/1974 | Anderson et al. | |
| 4,121,818 | A * | 10/1978 | Riley et al. | 270/52.29 |
| 4,149,711 | A | 4/1979 | Jackson | |
| 4,167,476 | A | 9/1979 | Jackson | |
| 4,302,198 | A | 11/1981 | Kawada | |
| 4,789,147 | A | 12/1988 | Berger et al. | |
| 4,984,948 | A | 1/1991 | Lindsay et al. | |
| 5,114,128 | A | 5/1992 | Harris et al. | |
| 5,294,100 | A | 3/1994 | Scheibelhut | |
| 5,314,176 | A | 5/1994 | Schmitt | |
| 5,317,654 | A | 5/1994 | Perry et al. | |
| 5,326,087 | A | 7/1994 | Colson et al. | |
| 5,467,973 | A | 11/1995 | Graushar et al. | |
| 5,547,175 | A | 8/1996 | Graushar et al. | |
| 5,818,724 | A | 10/1998 | Brewster et al. | |
| 6,167,326 | A | 12/2000 | Graushar et al. | |
| 6,192,295 | B1 | 2/2001 | Gunther | |
| 7,096,088 | B2 | 8/2006 | Graushar et al. | |
| 7,133,851 | B1 | 11/2006 | Benson | |
| 7,221,996 | B2 * | 5/2007 | Benson | 700/221 |

* cited by examiner

*Primary Examiner*—Gene Crawford
*Assistant Examiner*—Ramya Prakasam
(74) *Attorney, Agent, or Firm*—Michael Best & Friedrich LLP

(57) ABSTRACT

A method comprising providing printed products to form a first mail stream on a printing line, providing printed products to form a second mail stream on a printing line, and placing printed product from the second mail stream onto a printed product of the first mail stream to create the combined mail stream in the sequence of a master mailing list.

48 Claims, 1 Drawing Sheet

COMBINED MAILING STREAMS

CROSS-REFERENCE TO RELATED APPLICATIONS

This Application is a continuation-in-part of U.S. application Ser. No. 11/959,683 filed Dec. 19, 2007, which is a continuation of U.S. application Ser. No. 11/380,667 filed Apr. 28, 2006, now U.S. Pat. No. 7,333,878, which is a continuation of U.S. patent application Ser. No. 10/262,116 filed Oct. 1, 2002, now U.S. Pat. No. 7,096,088, which claims the priority benefit under 35 U.S.C. §119(e) of the U.S. Provisional Patent Application No. 60/326,324 filed on Oct. 1, 2001. The contents of these applications are hereby incorporated by reference herein.

BACKGROUND

With increasing postal costs and rates, printers and publishers are looking for ways to mail printed products more cost effectively. Combining two or more titles into one mail stream is one way to achieve postal savings. However, the combination of two or more mail streams in a production setting has proven complex and difficult.

SUMMARY

One embodiment of the invention is directed to a method comprising providing a master mailing list comprising a sequence of recipients, providing printed products to form a first mail stream on a printing line, providing printed products to form a second mail stream on a printing line, and placing printed product from the second mail stream onto a printed product of the first mail stream to create the combined mail stream in the sequence of the master mailing list.

Another embodiment of the invention is directed to a method comprising providing printed products to form a first mail stream on a finishing line, providing printed products to form a second mail stream on a finishing line, and placing printed product from the second mail stream onto a printed product of the first mail stream to create a combined mail stream.

Another embodiment of the invention is directed to a method comprising conveying a stream of printed products in series toward a printer, monitoring the thickness of each of the printed products of the stream of printed products, adjusting the height of the printer based on the thickness of each of the printed products of the stream of printed products to be delivered to the printer, and printing with the printer indicia on each of the printed products of the stream of printed products.

Figure 1:
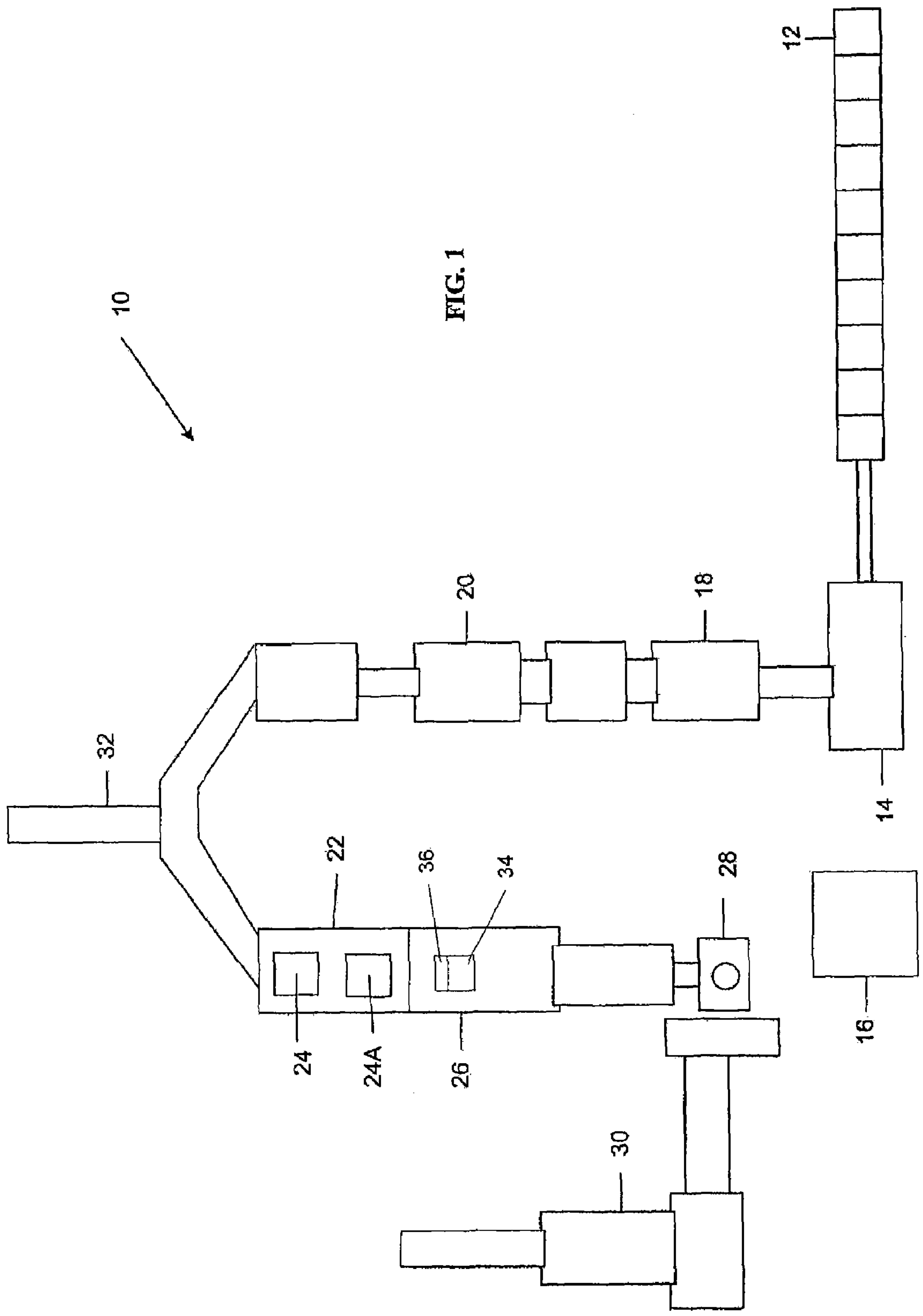
FIG. 1 is a schematic of the finishing process of the present invention.

Before one embodiment of the invention is explained in detail, it is to be understood that the invention is not limited in its application to the details of construction and the arrangement of components set forth in the following description or illustrated in the drawing. The invention is capable of other embodiments and of being practiced or being carried out in various ways. Also, it is to be understood that the phraseology and terminology used herein is for the purpose of description and should not be regarded as limiting.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The invention includes a method for combining at least two separate mail streams in a finishing process. In one embodiment, one mail stream is from a binding line, such as a stitcher or perfect binder, and the other mail stream is from a loader, such as a shuttle hopper. However, it should be noted that the mail steams can be from other pieces of finishing equipment or from other manufacturing lines as will be detailed below. Likewise, the method of combining at least two mail streams can be accomplished anywhere on a printing line including on a finishing line such as a binding line.

With reference to FIG. 1, a finishing line 10 (e.g., a binding line) is illustrated to manufacture bound printed products such as books, magazines, catalogs, direct mail pieces and the like. The finishing line 10 includes a series of pockets 12 to feed printed pieces to the finishing line 10 to create a first mail stream. The number of pockets 12 varies depending upon the title or titles to be bound on the finishing line 10. A binder 14, such as a saddle stitcher, then binds the individual printed pieces together. However, it should be noted that other types of binders that perform other methods of binding the printed products can be utilized with the present invention, such as a perfect binder.

The feeding of the printed pieces to the finishing line 10 is controlled by a controller 16 such as the FCS controller available from QTI of Sussex, Wis. The controller 16 controls assembly of the printed products according to a master mailing list of recipients. The assembly can be demographic such that the controller 16 assembles a printed product based upon individual recipient information, as is known in the art. Further, the controller 16 may control the simultaneous assembly of more than one title or version of the printed products using the pockets 12 and binder 14, a process termed multi-binding. For example, two titles can be simultaneously assembled and bound using the same set of pockets 12 and binder 14. The two titles would be assembled according to a master mailing list in a specific order to obtain optimum postal discounts. Three or more titles could also be assembled using this multi-binding process.

After binding, the printed products are conveyed to and trimmed by a trimmer 18. After the trimmer 18, this first mail stream may enter a buffer storage system or buffer 20. If a buffer is employed, the buffer 20 may be a conveyor type buffer such as that available from Sitma of Italy as model 953 and may be able to hold 100-400 printed products. The buffer 20 holds then delivers the printed products to a mail table 22 as needed and as controlled by the controller 16 as will be further explained below.

Preferably, a second mail stream enters the finishing line 10 at the mail table 22 via a loader 24 such as a shuttle hopper. It should be noted that other types of equipment could be utilized to deliver the second mail stream to the mail table 22.

The loader 24 feeds the printed products of the second mail stream to the same mail table 22 where printed products of the first mail stream are delivered. The second mail stream includes already bound printed products that may or may not be pre-addressed and/or bound. If pre-addressed, optionally a verification step can occur during which each printed product is checked to make sure the address indicia thereon is the same address indicia for the printed product in that sequence position according to the master mailing list.

The two mail streams are combined at the mail table 22 so an intended master mailing list sequence is produced. The master mailing list sequence includes the recipients of both mail streams. Such a combination of two mail streams is designed to increase postal discounts and/or reduce the postal rates on the combined mail stream. The sequence of the master mailing list is known to the controller 16. The controller 16 controls the assembly of the printed products of the first mail stream and controls the feeding of the printed products of the second mail stream to the mail table 22. Thereby, at the mail table 22, the two streams are combined in the proper order according to the master mailing list sequence.

According to one embodiment of the invention, when the printed products of the first mail stream exit the buffer 20, the controller 16 instructs the buffer 20 to leave gaps in the stream, i.e., empty chain slots, into which printed products of the second mail stream will be placed at the mail table 22. The controller 16 and the buffer 20 operate together to feed the printed products of the first mail stream to the mail table 22 when needed according to the master mailing list. The mail table 22 therefore runs at a faster average speed than the binder 14 to accommodate both mail streams. The number of printed products of the second mail stream delivered to the mail table 22 from the loader 24 and into the gaps determines this increased speed. In other embodiments, the controller 16 operates without a buffer to create gaps in the stream by signaling the loaders 24 or pockets 12 to leave open (i.e., not deliver printed products to) specific chain slots.

The buffer 20 has a varying output from that of its input. Printed products can be introduced into the buffer 20 without any printed products being removed from it. The opposite is also true in that printed products can be removed from the buffer 20 without any being introduced. The buffer 20 retains the printed products of the first mail stream in the order they were sent into the buffer in a first in, first out arrangement. As an output, the buffer creates the empty chain slots into which printed products of the second mail stream will be placed at the mail table 22. The buffer 20 operates at varying speeds depending upon input and output requirements which are governed by the need to deliver a particular printed product to the mail table 22 at the correct time as controlled by the controller 16.

The resulting mail stream exiting the mail table 22 is a combination of the first mail stream from the binder 14 and the second mail stream from the loader 24, with that combination being in the sequence determined by the master mailing list.

Optionally, a second mail table 26 or an extension of the mail table 22 can be used to apply address indicia to the printed products of the combined mail stream. For example, the address indicia can be applied to the printed products with an inkjet printer. The printed products in the combined mail stream are then conventionally accumulated in a stacker 28 and bundled in the bundle wrapper 30.

With this process, if the binder 14 goes down or there are other problems assembling the first stream of printed products, the finishing process can continue functioning with the printed products in the buffer 20 rather than shutting down the entire finishing line 10. This results in increased efficiency and cost savings especially if the problem can be remedied prior to the buffer 20 running out of printed products.

It should be noted that other layouts of combining two mail streams are covered by the invention. For example, printed products could be diverted to another packaging process which could include the buffer 20 and loader 24 or like components. In another example, two buffers 20 can be linked together in series to create increased buffer capacity for the printed products of the first mail stream, such as 200-800 printed products.

It should also be noted that multiple loaders 24 feeding printed products to the mail table 22 can be employed to combine more than two mail streams. For example, a second loader 24A could feed a third stream of printed products to the mail table 22.

In another embodiment of the invention, the empty chain slots that are created in the embodiment described above are temporarily utilized in the assembly of another mail stream. Specifically, the controller 16 using the master mail list sequence determines where empty chain slots need to be created into which printed products from the second mail stream will be placed by the loader 24 at the mail table 22. The controller 16 then controls the assembly of another stream of printed products with each printed product being placed temporarily into one of the empty chain slots. The printed products of this mail stream are then diverted from the finishing line 10 prior to the mail table 22 thus making the empty chain slots available for the printed products of the second mail stream, such as, for example, at a divert gate 32.

This process is particularly suited for the assembly of a newsstand version of a printed product which would have no recipient or address information associated with it and would therefore need to be in no particular sequence. Typically, the newsstand version of a title is created on the finishing line 10 either before or after subscriber versions, thus taking up additional time and resources. In the process described herein, the newsstand version is assembled and positioned at each empty chain slot position and then diverted prior to the mail table 22, thus saving time and resources in production.

According to another embodiment of the invention, the printed products of the first mail stream exit the buffer 20 or loader 24 such that the creation of gaps is reduced or eliminated, i.e., reduction or elimination of empty chain slots. Rather than insert printed products of the second mail stream into empty chain slots, the controller 16 will operate together with the loader 24 and/or buffer 20 to feed the printed products of the second mail stream directly onto the printed products of the first mail stream occupying the chain slots when needed according to the controlled sequence of the master mailing list.

The resulting mail stream exiting the mail table 22 is a combination of the first mail stream from the binder 14 and the second mail stream from the loader 24, with that combination being in the sequence determined by the master mailing list. For example, the resulting mail stream can include a series of chain slots that include either a single printed product of the first mail stream or a printed product of the second stream stacked on top of a printed product of the first mail stream. In yet other embodiments, empty chain slots could also be created by the buffer 20 or the controller 16 without a buffer to provide for the option of creating a resulting mail stream including a series of chain slots that have either no printed products, a single printed product from the first mail stream, a single printed product from the second mail stream, or a printed product of the second mail stream stacked on top of a printed product of the first mail stream.

It should also be noted that multiple loaders 24 feeding printed products to the mail table 22 can be employed in this embodiment to combine more than two mail streams. For example, a second loader 24A could feed a third stream of printed products to the mail table 22. In this example, a resulting mail stream can include a series of chain slots that have either no printed products (with a gap created by the buffer 20 or the controller 16 without a buffer), a single printed product from the first mail stream, a single printed product from the second mail stream, a single printed product from the third mail stream, a printed product of the second mail stream stacked on top of a printed product of the first mail stream, a printed product of the third mail stream stacked on top of a printed product of the first mail stream, a printed product of the third mail stream stacked on top of a printed product of the second mail stream, or a printed product of the third mail stream stacked on top of a printed product of the second mail stream stacked on top of a printed product of the first mail stream.

Optionally, the second mail table 26 or an extension of the mail table 22 can be used to apply address indicia to the printed products of the combined mail stream. For example, the address indicia can be applied to the printed products with a printer 34.

The printer 34 can be coupled to an actuator 36 that is controlled by the controller 16 to extend or retract controlled distances to adjust the vertical position of the printer 34. The control can be any type of control, including mechanical, electrical or electronic control. The vertical adjustment of the printer 34 allows printing of address indicia onto the printed product of each chain slot, regardless of the thickness of the printed product or printed products that occupy a chain slot. As described above, the overall height of the printed product/products in each chain slot depends on whether the chain slot includes a single printed product or multiple products and the thickness of the printed product/products. The controller 16 can monitor the thickness, number, and identity of each of the printed products in each chain slot and can control the actuator 36, and thereby the height of the printer 34, to the proper height to print the address indicia onto the printed product. The controller 16 may also monitor the thickness of the stack within each chain slot regardless of whether the chain slot includes a single printed product or multiple printed products. The speed of the adjustment is fast enough to continuously adjust between sequential chain slots. If address indicia is desired on any lower printed product within a stack of printed products in a chain slot, an additional printer can be used upstream of the loader stacking a subsequent printed product. Such a printer 34 can be used to print on printed products of different thicknesses and would enable such different printed products to be made in a single stream, on a multi-binding line for example. Such a printer also permits printing upon a second printed product (of various thickness) from a second stream that is combined in the same chain slot as the printed product from the first stream.

In other embodiments, the controller 16 can control the actuator 36 to move the printer 34 controlled distances to adjust the horizontal position of the printer 34. The controller 16 can be any type of control, including mechanical, electrical or electronic control. The horizontal adjustment of the printer 34 allows printing of address indicia at any desired upwardly-facing location on the printed product of each chain slot, regardless of the spine-to-face measurement and regardless of the head-to-foot measurement of the printed product or printed products that occupy a chain slot. The controller 16 can monitor the measurements of each of the printed products in each chain slot and can control the actuator 36, and thereby the horizontal location of the printer 34, such that the address indicia can be printed in any desired upwardly-facing location on the printed product. The speed of the adjustment is fast enough to continuously adjust between sequential chain slots. Such a printer 34 can be used to print on printed products having different measurements and would enable such different printed products to be made in a single stream, on a multi-binding line for example.

In yet other embodiments, the controller 16 can control the actuator 36 to move the printer 34 controlled distances to adjust both the vertical and horizontal positions of the printer 34 allowing printing of address indicia at any desired upwardly-facing location on the printed product of each chain slot regardless of the thickness, regardless of the spine-to-face measurement, and regardless of the head-to-foot measurement of the printed product or printed products that occupy a chain slot.

The printed products in the combined mail stream are then accumulated in a stacker 28 and bundled in the bundle wrapper 30.

What is claimed is:

1. A method comprising:

providing a master mailing list comprising a sequence of recipients;

providing printed products to form a first mail stream on a first printing line;

providing printed products to form a second mail stream on a second printing line; and placing at least some of the printed products from the second mail stream onto selected printed products of the first mail stream to create a combined mail stream in the sequence of the master mailing list.

2. The method of claim 1 wherein providing printed products to form the first mail stream comprises assembling printed products to form the first mail stream on the first printing line.

3. The method of claim 1 wherein the combined mail stream is formed without the use of a buffer.

4. The method of claim 1 wherein the combined mail stream is formed with the use of a buffer.

5. The method of claim 1 wherein each printed product from the second mail stream that is laced onto a selected printed product of the first mail stream is placed into a chain slot occupied by the selected printed product of the first mail stream.

6. The method of claim 1 further comprising printing address indicia on at least a portion of the printed products of the combined mail stream.

7. The method of claim 1 wherein the first mail stream is assembled using pockets and a binder.

8. The method of claim 7, wherein the binder is a stitcher.

9. The method of claim 7, wherein the binder is a perfect binder.

10. The method of claim 1 wherein a loader provides the second mail stream to the first printing line.

11. The method of claim 10 wherein the loader is a shuttle hopper.

12. The method of claim 1 wherein the first and second mail streams are combined on a mail table.

13. The method of claim 1 further comprising stacking and bundling the combined mail stream.

14. The method of claim 1 wherein the first mail stream comprises at least two different titles.

15. The method of claim 1 wherein the first mail stream comprises at least two different versions of a printed product.

16. The method of claim 1 further comprising feeding a third stream of printed products to the first printing line.

17. The method of claim 1 wherein the printed products of the second mail stream are pre-addressed.

18. The method of claim 1, wherein each printed product from the second mail stream that is placed onto a selected printed product of the first mail stream is placed onto the selected printed product of the first mail stream while the printed product from the second mail stream is being combined with the first mail stream to create the combined mail stream.

19. The method of claim 1, wherein the first printing line is a finishing line.

20. The method of claim 19, wherein the finishing line is a binding line.

21. The method of claim 20, wherein the binding line is a stitching line.

22. The method of claim 20, wherein the binding line is a perfect binding line.

23. A method comprising:

providing printed products to form a first mail stream on a finishing line;

providing printed products of a second mail stream to the finishing line; and placing at least some of the printed products from the second mail stream onto selected printed products of the first mail stream to create a combined mail stream.

24. The method of claim 23 wherein the second mail stream comprises bound printed products.

25. The method of claim 23 further comprising providing a master mailing list including a sequence of recipients; and creating the combined mail stream in the sequence of the master mailing list on the finishing line.

26. The method of claim 23 wherein providing printed products to form the first mail stream comprises assembling printed products to form the first mail stream on the finishing line.

27. The method of claim 23 wherein the combined mail stream is created without the use of a buffer.

28. The method of claim 23 wherein the combined mail stream is created with the use of a buffer.

29. The method of claim 23 wherein each printed product from the second mail stream that is placed onto a selected printed product of the first mail stream is placed into a chain slot occupied by the selected printed product of the first mail stream.

30. The method of claim 23 further including the act of printing address indicia on at least a portion of the printed products of the combined mail stream.

31. The method of claim 23 wherein the first mail stream is assembled using pockets and a binder.

32. The method of claim 23 wherein a loader provides the second mail stream to the finishing line.

33. The method of claim 32 wherein the loader is a shuttle hopper.

34. The method of claim 23 wherein the first and second mail streams are combined on a mail table.

35. The method of claim 23 further comprising stacking and bundling the combined mail stream.

36. The method of claim 23 wherein the first mail stream comprises at least two different titles.

37. The method of claim 23 wherein the first mail stream comprises at least two different versions of a printed product.

38. The method of claim 23 and further comprising feeding a third mail stream of printed products to the finishing line.

39. The method of claim 23 wherein the printed products of the second mail stream are pre-addressed.

40. The method of claim 23 wherein each printed product from the second mail stream that is placed onto a selected printed product of the first mail stream is placed onto the selected printed product of the first mail stream while the printed product from the second mail stream is being combined with the first mail stream to create the combined mail stream.

41. A method comprising:

conveying a stream of printed products in series toward a printer;

monitoring the thickness of each of the printed products of the stream of printed products;

adjusting the height of the printer based on the thickness of each of the printed products of the stream of printed products to be delivered to the printer; and printing with the printer indicia on each of the printed products of the stream of printed products.

42. The method of claim 41 further comprising combining a first stream of printed products and a second stream of printed products to create the stream of printed products.

43. The method of claim 42 wherein the printed products of the first stream comprise a first thickness and the printed products of the second stream comprise a second thickness different from the first thickness.

44. The method of claim 42 further comprising stacking a printed product of the second stream on top of a printed product of the first stream.

45. The method of claim 44 wherein the stack of printed products of the first and second streams are within a chain slot.

46. The method of claim 44 wherein monitoring the thickness of each of the printed products of the stream of printed products comprises monitoring the thickness of the stack of printed products within a chain slot and wherein adjusting the height comprises providing a signal to an actuator to adjust the height of the printer based on the thickness of the stack of printed products to be delivered to the printer.

47. The method of claim 41 wherein a controller monitors the thickness of each printed product of the stream of printed products and provides a signal to an actuator to adjust the height of the printer based on the thickness of each of the printed products of the stream of printed products to be delivered to the printer.

48. The method of claim 41 wherein the indicia includes an address.

* * * * *